(12) United States Patent
van Nee

(10) Patent No.: US 8,014,463 B2
(45) Date of Patent: Sep. 6, 2011

(54) DELAY DIVERSITY AND SPATIAL ROTATION SYSTEMS AND METHODS

(75) Inventor: Didier Johannes Richard van Nee, De Meern (NL)

(73) Assignee: Qualcomm Incorporated, San Diego, CA (US)

( * ) Notice: Subject to any disclaimer, the term of this patent is extended or adjusted under 35 U.S.C. 154(b) by 854 days.

(21) Appl. No.: 11/380,116

(22) Filed: Apr. 25, 2006

(65) Prior Publication Data

US 2006/0268165 A1 Nov. 30, 2006

Related U.S. Application Data

(60) Provisional application No. 60/684,933, filed on May 25, 2005.

(51) Int. Cl.
*H04L 27/00* (2006.01)
(52) U.S. Cl. ........ 375/295; 375/267; 375/299; 375/347; 455/101; 455/103; 455/25; 348/388.1
(58) Field of Classification Search .................. 375/295, 375/267, 299, 347; 348/388.1; 455/101, 455/103, 25
See application file for complete search history.

(56) References Cited

U.S. PATENT DOCUMENTS

| | | | | |
|---|---|---|---|---|
| 6,377,632 | B1 * | 4/2002 | Paulraj et al. ................. | 375/299 |
| 7,636,297 | B1 * | 12/2009 | Lee et al. ...................... | 370/208 |
| 2005/0157806 | A1 * | 7/2005 | Walton et al. ................. | 375/267 |
| 2005/0254592 | A1 * | 11/2005 | Naguib et al. ................. | 375/267 |
| 2006/0067421 | A1 * | 3/2006 | Walton et al. ................. | 375/267 |
| 2006/0270353 | A1 * | 11/2006 | Webster et al. .............. | 455/63.4 |

OTHER PUBLICATIONS

Mujtaba, S. "TGn Sync Proposal Technical Specification", Nov. 4, 2004, TGn Sync, IEEE 802.11-04/889r1.*

* cited by examiner

*Primary Examiner* — Shuwang Liu
*Assistant Examiner* — Sung Ahn
(74) *Attorney, Agent, or Firm* — Turocy & Watson, LLP

(57) ABSTRACT

A transmitter usable for wireless communication includes a plurality of transmit antennas. Each transmit antenna transmits a transmit signal. The transmitter also includes means for introducing time shifts to each of a plurality of spatial stream signals and means for operating on each of the plurality of spatial stream signals with a spatial rotation vector matrix, thereby mapping each of the plurality of spatial stream signals to one of the transmit signals.

27 Claims, 5 Drawing Sheets

US 8,014,463 B2

DELAY DIVERSITY AND SPATIAL ROTATION SYSTEMS AND METHODS

CROSS-REFERENCE TO RELATED APPLICATIONS

This application claims priority from co-pending U.S. Provisional Patent Application No. 60/684,933 filed May 25, 2005 entitled "Delay Diversity and Spatial Rotation Systems and Methods" which is hereby incorporated by reference, as if set forth in full in this document, for all purposes.

BACKGROUND OF THE INVENTION

Embodiments of the present invention relate generally to wireless communication. More specifically, embodiments of the invention relate to systems and methods for transmitting signals from a wireless device where the number of transmit antennas is larger than or equal to the number of spatial streams transmitted.

Delay diversity is a technique used to increase the performance of a wireless link by transmitting delayed copies of the same input data signal from multiple transmit antennas. For example, wireless devices, such as wireless routers and other devices commonly used in various types of Wireless Local Area Networks (WLANs), utilize multiple transmit signals and multiple antennas for transmission of input data streams or signals. These multiple transmission channels can be used to transmit copies of the input data stream or data signal. The redundancy of transmitting copies of the data stream increases reliability of the transmit signals. However, to avoid interference between these copies, a delay or time shift is introduced to create a spatial spread between the transmitted copies.

More specifically, FIG. 1 shows a block diagram of a system in which delay diversity is used to create spatial spreading between transmitted signals. In this system 100, an input data stream 101 can be provided to Forward Error Correction (FEC) encoder 105. Codewords are created by FEC encoder 105 adding parity bits to the input data stream 101. The codewords created by FEC encoder 105 can be provided to puncture module 110 which selectively removes redundant bits to provide for more efficient transmissions. Puncture module 110 then supplies the codewords to spatial stream parser 115. Spatial stream parser 115 separates or copies the input data stream into a number ($N_{ss}$) of spatial streams. Generally speaking, the number of spatial streams is less than or equal to the number of antennas 180 and 185 and/or the number ($N_{tx}$) of transmit streams.

The separate spatial streams can then be applied to frequency interleavers 120 and 130 which re-order or rearrange the bits prior to the streams being mapped to individual quadratture carriers by Quadruple Amplitude Modulation (QAM) mapping modules 125 and 135. A spatial spread can then be applied to the individual spatial streams by Walsh matrix operation (W) 140. With this technique, the $N_{ss}$ spatial stream input signals are first spread by a multiplication with the first $N_{ss}$ columns of the $N_{tx}$-by-$N_{tx}$ Walsh matrix:

$$W = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

This scheme reduces to a conventional delay diversity system when there is only one spatial stream ($N_{ss}=1$), because for that case only the first column of the Walsh matrix is used which is an all-ones column, so the 'W' operation reduces to copying one input stream to $N_{tx}$ identical outputs.

After this operation, the transmit streams output by Walsh matrix operation 140 can be applied to Inverse Fast Fourier Transform (IFFT) modules 145 and 160 to combine the spatial streams and sub-carriers into a time domain signal. A different cyclic delay is applied to each of the transmit streams ($N_{tx}$) by one or more cyclic delay modules 165. A Guard Interval (GI) can be inserted between blocks of data on each transmit stream and the individual transmit streams by GI modules 150 and 170. Finally, the individual transmit streams can be used by analog and RF modules 155 and 175 to modulate a Radio Frequency (RF) carrier for transmission by antennas 180 and 185.

A disadvantage of such spatial spreading is that, for highly correlated channels, each spatial stream experiences deep nulls for every antenna orientation. This is because the transmitted signals for each spatial stream are delayed copies that cancel each other on certain frequencies. For $N_{ss}=1$ and $N_{tx}>1$, at least one deep null in the received spectrum exists. For $N_{ss}<1$ in strongly correlated channels, each spatial stream experiences at least one deep null in the received spectrum, but the nulls are generally at a different location for each spatial stream.

For at least the foregoing reasons, improved systems and methods are needed.

BRIEF SUMMARY OF THE INVENTION

Systems, methods, and machine-readable media are disclosed to provide for combining delay diversity with spatial rotation. According to one embodiment, a transmitter usable for wireless communication can comprise a plurality of transmit antennas, wherein each transmit antenna transmits a transmit signal. The transmitter can also have a means for introducing time shifts to each of a plurality of spatial stream signals. The means for introducing time shifts to each of a plurality of spatial stream signals can comprise a means for introducing cyclic shifts or linear time shifts. Cyclic shifts can be applied in either the time domain or the frequency domain and can comprise introducing cyclic delays to at least one of the plurality of spatial streams or introducing cyclic advantages to at least one of the plurality of spatial streams. Furthermore, the transmitter can have a means for operating on each of the plurality of spatial stream signals with a spatial rotation vector matrix, thereby mapping each of the plurality of spatial stream signals to one of the transmit signals. According to one embodiment, the means for introducing time shifts to each of the plurality of spatial stream signals can operate on the plurality of spatial streams before the means for operating on each of the plurality of spatial stream signals with a spatial rotation vector matrix operates on the spatial streams.

According to another embodiment, a method of communicating in a wireless network can comprise receiving a number (Nss) of input signals and producing a number (Ntx) of output signals that are time shifted copies of the Nss input signals, wherein Ntx is greater than or equal to Nss. Producing Ntx output signals that are time shifted copies of the Nss input signals can comprise producing Ntx output signals that are cyclically shifted copies of the Nss input signals or linearly shifted copies of the Nss input signals. Producing Ntx output signals that are cyclically shifted copies of the Nss input signals comprises producing Ntx output signals that are cyclically shifted in the time domain or the frequency domain. Furthermore, producing Ntx output signals that are cyclically shifted copies of the Nss input signals can comprise producing Ntx output signals wherein at least one of the Ntx signals comprises a cyclically delayed signal or a cyclically advanced signal. The method can also comprise operating on the Ntx output signals using a Ntx-by-Ntx unitary spatial rotation matrix and broadcasting the Ntx output signals.

According to yet another embodiment, a wireless transmitter for transmitting a plurality of transmit streams can comprise a time shift module adapted to introduce time shifts to one or more of a plurality of spatial stream signals. The time shift module can be adapted to introduce cyclic shifts or linear time shifts to one or more of the plurality of spatial stream signals. When introducing cyclic shifts, the time shift module can introduce a cyclic delay or cyclic advantage to at least one of the plurality of spatial stream signals. Futhermore, the cyclic shifts can be applied in either the time domain or the frequency domain. The transmitter can also have a spatial rotation module communicatively coupled with the time shift module and adapted to receive the plurality of spatial stream signals from the time shift module and to operate on each of the spatial stream signals with a spatial rotation vector matrix, thereby mapping each of the plurality of spatial stream signals to one of the transmit signals. In some cases, the spatial rotation vector matrix can comprise a Walsh matrix having dimensions based on a number of spatial streams in the plurality of spatial streams and a number of transmit streams in the plurality of transmit streams.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Embodiments of the present invention provide systems and methods for transmitting (Multiple Input/Single Output) MISO and (Multiple Input/Multiple Output) MIMO signals where the number of transmit antennas is larger than or equal to the number of spatial streams. Such methods provide transmitter diversity without undesired beamforming effects. This results in better performance than conventional delay diversity techniques in spatially highly correlated channels, such as a line-of-sight channel without multipath.

Generally speaking, various embodiments described herein relate to combining delay diversity with spatial rotation. As will be seen, this combination can be achieved in both the time domain and the frequency domain. Furthermore, the delay diversity can be achieved with either a cyclic delay or a linear delay. Importantly, while embodiments of the present invention are discussed with reference to Orthogonal Frequency Division Multiplexing (OFDM) systems, it should be understood that various embodiments of the present invention are not limited to OFDM systems. Rather, embodiments providing delay diversity with spatial rotation are equally applicable to non-OFDM systems are also considered to be within the scope of the present invention.

For strongly correlated channels, Cyclic Delay Diversity (CDD) creates deep nulls in the received spectrum that cause a Signal-to-Noise Ratio loss over a 1×1 link using the same total transmit power. Using a 50 ns delay appears to be the worst case, creating one null in the received spectrum. Using larger delays gives multiple nulls but the dips appear more narrow than for the 50 ns case. Embodiments of the present invention address this problem by providing a combination of delay diversity and spatial rotation, either in the time domain or the frequency domain.

Figure 1:
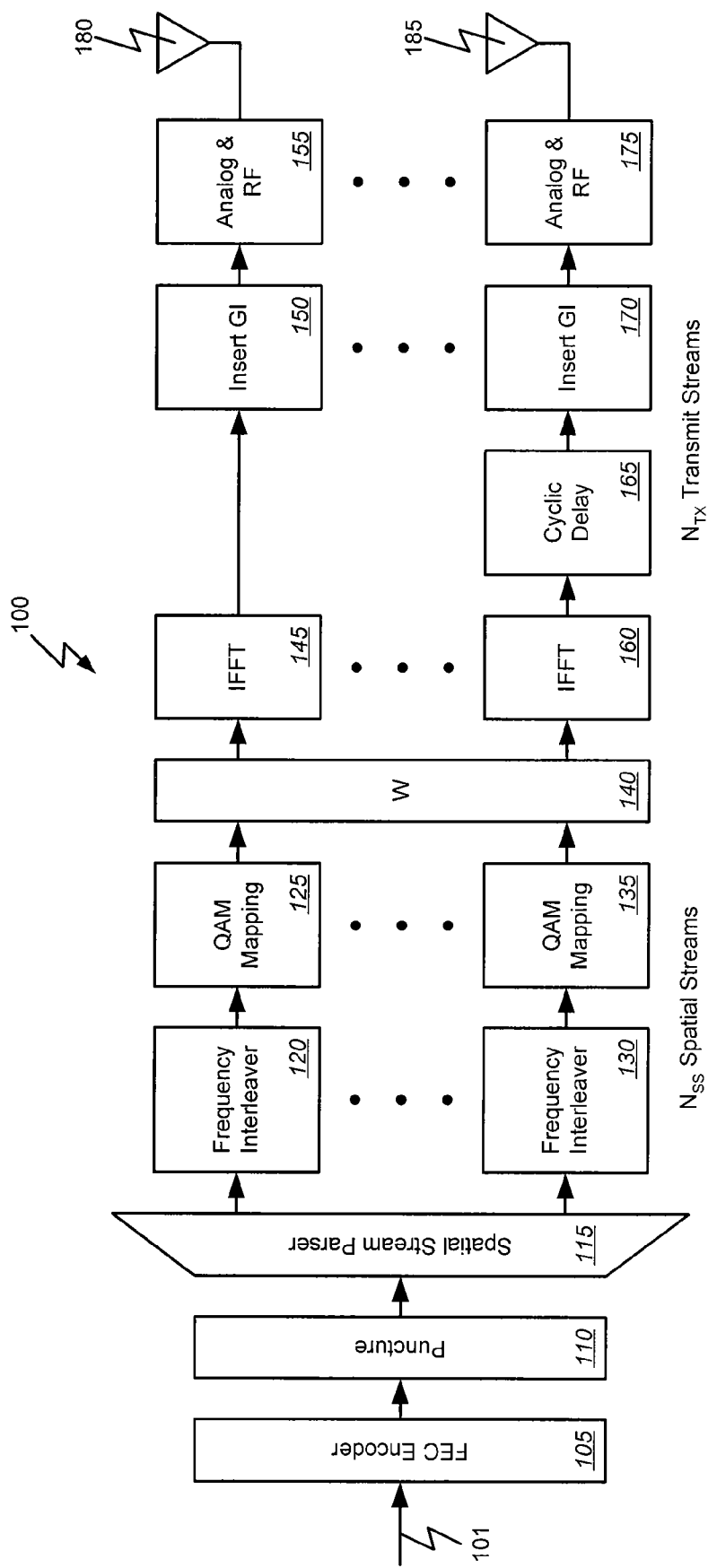
FIG. 1 illustrates a block diagram of a spatial spreading system.
Figure 2:
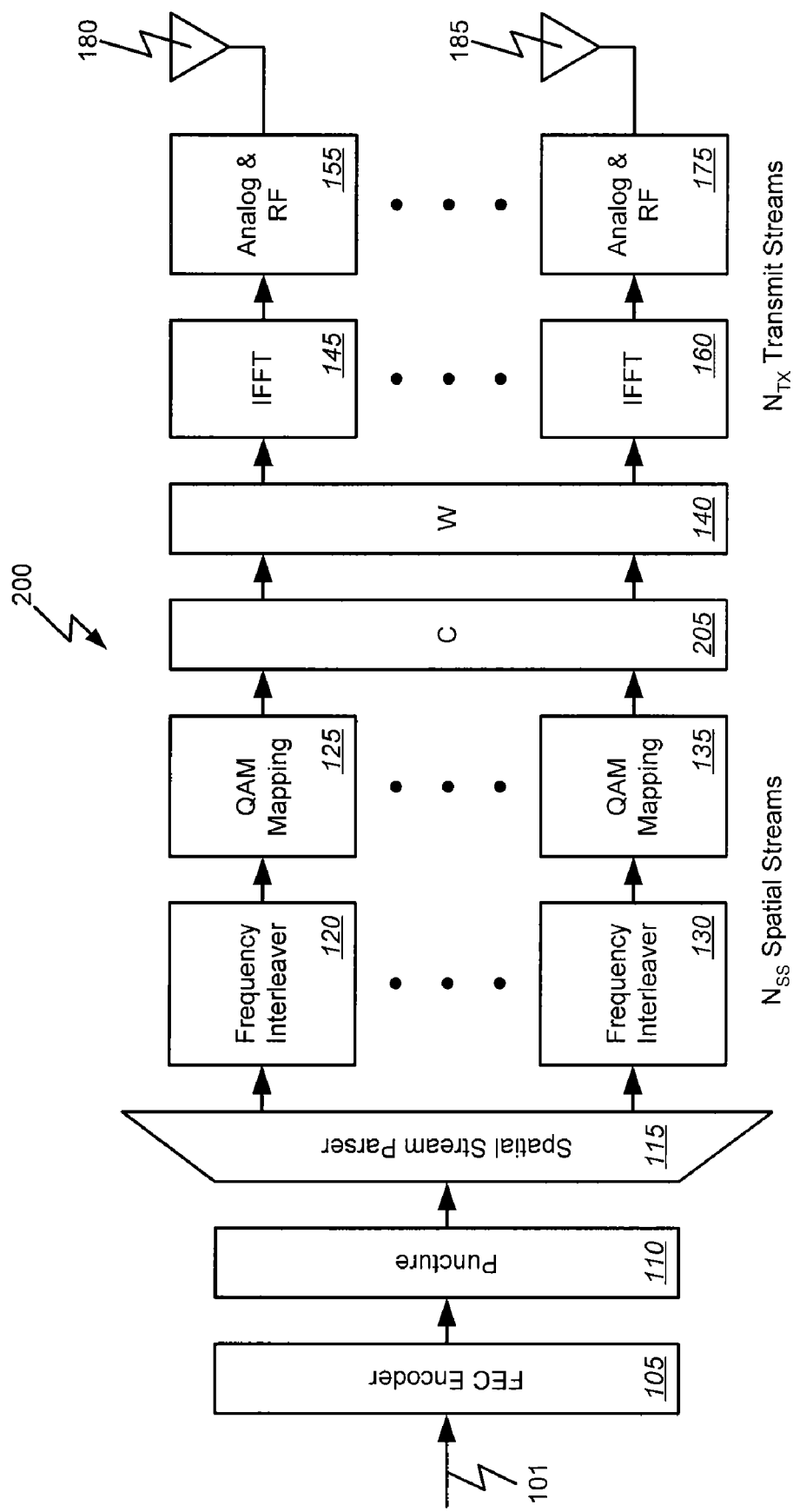
FIG. 2 illustrates a block diagram of a system for performing delay diversity and spatial rotation in the frequency domain according to one embodiment of the present invention.

FIG. 2 illustrates a system in which a combination of delay diversity and spatial rotation is used in the frequency domain to reduce the occurrence of deep fades in the received spectrum. In this system 200, an input data stream 101 can be provided to Forward Error Correction (FEC) encoder 105. FEC encoder 105 can create codewords by adding parity bits to the input data stream 101. As can be understood by those skilled in the art, these parity bits can be used by other devices receiving transmissions from this system 200 to detect and possibly correct errors caused during transmission and/or reception. Common methods for providing and/or checking such parity bits can include, but are not limited to, Reed-Solomon, Trellis, etc.

Codewords created by FEC encoder 105 can be provided to puncture module 110. Puncture module 110 in turn selectively removes redundant bits from the encoded input data stream. That is, puncture module 110 removes repetitive parity and/or other bits from the encoded input data stream to provide for more efficient transmissions. The puncture module 110 then supplies the punctured and encoded input data stream to spatial stream parser 115.

Spatial stream parser 115 separates or copies the input data stream into a number of spatial streams ($N_{ss}$). That is, spatial stream parser 115 copies the encoded and punctured input data stream into a number of spatial streams ($N_{ss}$) to which delay diversity and spatial rotation will be applied. Generally speaking, the number of spatial streams ($N_{ss}$) is less than or equal to the number of antennas 180 and 185 used to later transmit the streams.

The separate spatial streams can then be applied to frequency interleavers 120 and 130 which re-order or rearrange the bits. That is, frequency interleavers 120 and 130 change the order of the bits in the separate spatial streams so that the bits ultimately transmitted on separate sub-carriers are not mirror images of one another. This interleaving reduces the number of errors created by interference between the separate transmission streams.

The interleaved spatial streams can then be provided by the frequency interleavers 120 and 130 to Quadruple Amplitude Modulation (QAM) mapping modules 125 and 135. QAM mapping modules 125 and 135 map the separate, interleaved spatial streams to individual quadratture sub-carriers. That is, in an OFDM system, transmission streams are modulated onto sub-carriers for transmission. QAM mapping modules 125 and 135 map symbols, i.e., portions of the spatial streams, onto the separate sub-carriers. Importantly, it should be understood that, rather than using QAM, other types of modulation, such as Phase-Shift-Keying (PSK) for example, may also be used.

According to one embodiment of the present invention, a cyclic delay can be introduced to the separate spatial streams by cyclic delay module (C) 205. The cyclic delay module 205 can have $N_{ss}$ inputs and $N_{tx}$ outputs which are copies of the inputs with different cyclic delays. So, if $N_{ss}$=1 and $N_{tx}$=4, for example, C could be implemented as:

$$C = \begin{bmatrix} e^{-j2\pi k d_0/N} \\ e^{-j2\pi k d_1/N} \\ e^{-j2\pi k d_2/N} \\ e^{-j2\pi k d_3/N} \end{bmatrix}.$$

Here, N is the Inverse Fast Fourier Transform (IFFT) size, k the subcarrier index, and $d_0$, $d_1$, $d_2$, $d_3$ are the cyclic delays in samples of transmitter signals 0, 1, 2, 3, respectively. Note that the cyclic delays may also be negative to give cyclic advances rather than delays. Fractional numbers are also possible. Possible values for $d_0$, $d_1$, $d_2$, $d_3$ are $\{-2, 0, 2, 4\}$ or $\{0, 1, 2, 3\}$.

If $N_{ss}$=2 and $N_{tx}$=4, C could be implemented as:

$$C = \begin{bmatrix} e^{-j2\pi k d_0/N} & 0 \\ e^{-j2\pi k d_1/N} & 0 \\ 0 & e^{-j2\pi k d_2/N} \\ 0 & e^{-j2\pi k d_3/N} \end{bmatrix}.$$

Possible values for $d_0$, $d_1$, $d_2$, $d_3$ are $\{0, 2, 0, 2\}$ or $\{0, 2, 1, 3\}$.

Therefore, cyclic delay module 205 provides a means for introducing time shifts to each of a plurality of spatial stream signals. Stated another way, the cyclic delay module 205 comprises means for introducing cyclic shifts. Introducing the cyclic shifts may comprise introducing cyclic delays or cyclic advantages to at least one of the plurality of spatial streams.

After the delay diversity operation, a spatial rotation can be performed by multiplying $N_{tx}$ input signals with a $N_{tx}$-by-$N_{tx}$ Walsh matrix operation 140. Here, this matrix is:

$$W = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

Therefore, Walsh matrix operation 140 provides means for operating on each of the plurality of spatial stream signals with a spatial rotation vector matrix, thereby mapping each of the plurality of spatial stream signals to one of the transmit signals.

After this operation, the transmit streams output by the Walsh matrix operation 140 can be applied to an Inverse Fast Fourier Transform (IFFT) module 145 and 160 to combine the spatial streams and sub-carriers into a time domain signal. Finally, the individual transmit streams can be used to by analog and RF modules 155 and 175 modulate a Radio Frequency (RF) carrier for transmission by antennas 180 and 185.

Figure 3:
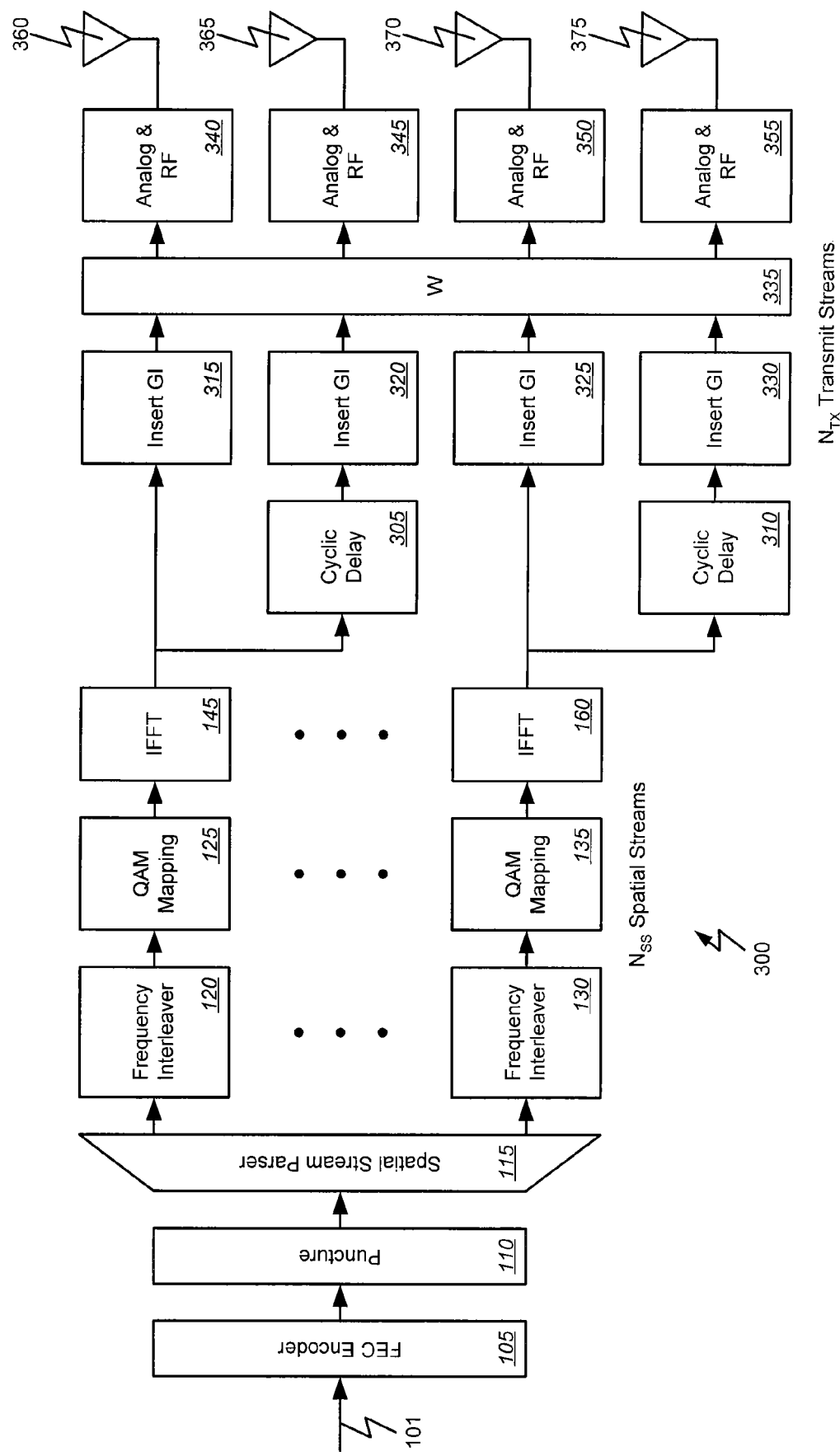
FIG. 3 illustrates a block diagram of a system for performing delay diversity and spatial rotation in the time domain according to an alternative embodiment of the present invention.

As noted above, the delay diversity plus spatial rotation technique can also be implemented in the time domain as depicted in FIG. 3. This example illustrates a system 300 for performing delay diversity and spatial rotation in the time domain according to an alternative embodiment of the present invention. This system includes FEC encoder 105, puncture module 110, and spatial stream parser 115 as in the previous example discussed above with reference to FIG. 2. In this system 300, the number of spatial streams, i.e., the number of streams after spatial stream parser 115 is two ($N_{ss}$=2). This system 300 also includes frequency interleavers 120 and 130 and QAM mapping modules 125 and 135, also as discussed above with reference to FIG. 2.

However, in this system 300, after the spatial streams are mapped to the individual sub-carriers by QAM mapping modules 125 and 135, the spatial streams can be applied to Inverse Fast Fourier Transform (IFFT) modules 145 and 160 to combine the spatial streams and sub-carriers into a time domain signal. Also in this system 300, the number of transmit streams, i.e., the streams after IFFT modules 145 and 160, is four ($N_{tx}$=4). A different cyclic delay can be applied to one or more of the transmit streams ($N_{tx}$) by one or more cyclic delay modules 305 and 310. Alternatively, rather than introducing one or more cyclic delays, linear delays may be utilized. Stated another way, cyclic delay modules 305 and 310 provide a means for introducing time shifts to each of a plurality of spatial stream signals. Achieving these time shifts can be accomplished by introducing cyclic shifts or, as will be discussed further below, by introducing linear shifts. Introducing the cyclic shifts may comprise introducing cyclic delays or cyclic advantages to at least one of the plurality of spatial streams.

A Guard Interval (GI) can be inserted between blocks of data on each transmit stream by GI modules 315-330. As can be understood by those skilled in the art, a guard interval comprises a brief extension of each block of data in which no new data is transmitted to reduce the effect of "echo" or "smearing" between blocks on each transmit stream. The individual transmit streams can then be applied to Walsh matrix module 335.

As in the previous example, a spatial rotation can be applied to the individual spatial streams by Walsh matrix operation 335. With this technique, the $N_{ss}$ spatial stream input signals are multiplied with the first $N_{ss}$ columns of the $N_{tx}$-by-$N_{tx}$ Walsh matrix. Finally, the output of the Walsh matrix operation 335, i.e., the individual transmit streams, can be used to modulate a Radio Frequency (RF) carrier by analog and RF modules 340-355 for transmission by antennas 360-375. Therefore, Walsh matrix operation 335 provides means for operating on each of the plurality of spatial stream signals with a spatial rotation vector matrix, thereby mapping each of the plurality of spatial stream signals to one of the transmit signals.

As noted above, the cyclic delays applied by cyclic delay modules 305 and 310 can alternatively be replaced by linear delays. Use of linear delays, rather than cyclic delays, may be especially useful when applied to a non-OFDM system. For example, delay diversity plus spatial spreading can be applied to get diversity gain for transmissions of IEEE 802.11 Barker code modulated signals with data rates of 1 or 2 Mbps. In this particular case, $N_{ss}=1$ and $N_{tx}$ could be for instance 2 or 4. For a three-transmitter system, the Walsh matrix operation 335 would be a 3×3 unitary matrix like the 3×3 Fourier matrix. Alternatively, the Walsh matrix operation 335 could be a 4×4 Walsh matrix with the 4th input signal being set to zero.

Systems such as described above with reference to FIG. 2 or FIG. 3 that utilize a combination of delay diversity, either cyclical or linear, in combination with spatial rotation and implemented in either the frequency domain or the time domain can provide improved performance over a systems using either delay diversity or spatial spreading. To understand why delay diversity plus spatial rotation performs better than delay diversity or spatial spreading, consider the example of $N_{ss}=1$, $N_{tx}=2$, $d_0=0$, $d_1=2$, $N=64$, in a multipath-free line-of-sight channel. A user with one receive antenna receives the sum of the two delayed transmitted signals. To this user, the radio channel frequency response looks like:

$$H(f)=1+e^{-j(\phi+2\pi k d_1/N)}.$$

Here, $\phi$ is a constant phase difference between the two transmitted signals at the receiver that can range between 0 and $2\pi$ and depends on the orientation of the two transmitter antennas relative to the receiver. The received channel H(f) shows 2 infinitely deep nulls within a bandwidth of N subcarriers for every value of $\phi$. If delay diversity plus spatial rotation is applied using the same delays $d_0=0$, $d_1=2$, and the spatial rotation matrix then the received channel looks like:

$$W = \begin{bmatrix} 1 & 1 \\ 1 & -1 \end{bmatrix}$$

then the received channel looks like:

$$H(f)=1+e^{-j2\pi k d_1/N}+e^{-j\phi}(1-e^{-j2\pi k d_1/N}).$$

This channel does not show infinitely deep nulls for every value of $\phi$. For instance, if $\phi=0$, H(f)=2, so the received channel is flat without any notches, while the channel for the case of delay diversity or spatial spreading shows 2 infinitely deep notches.

Figure 4:
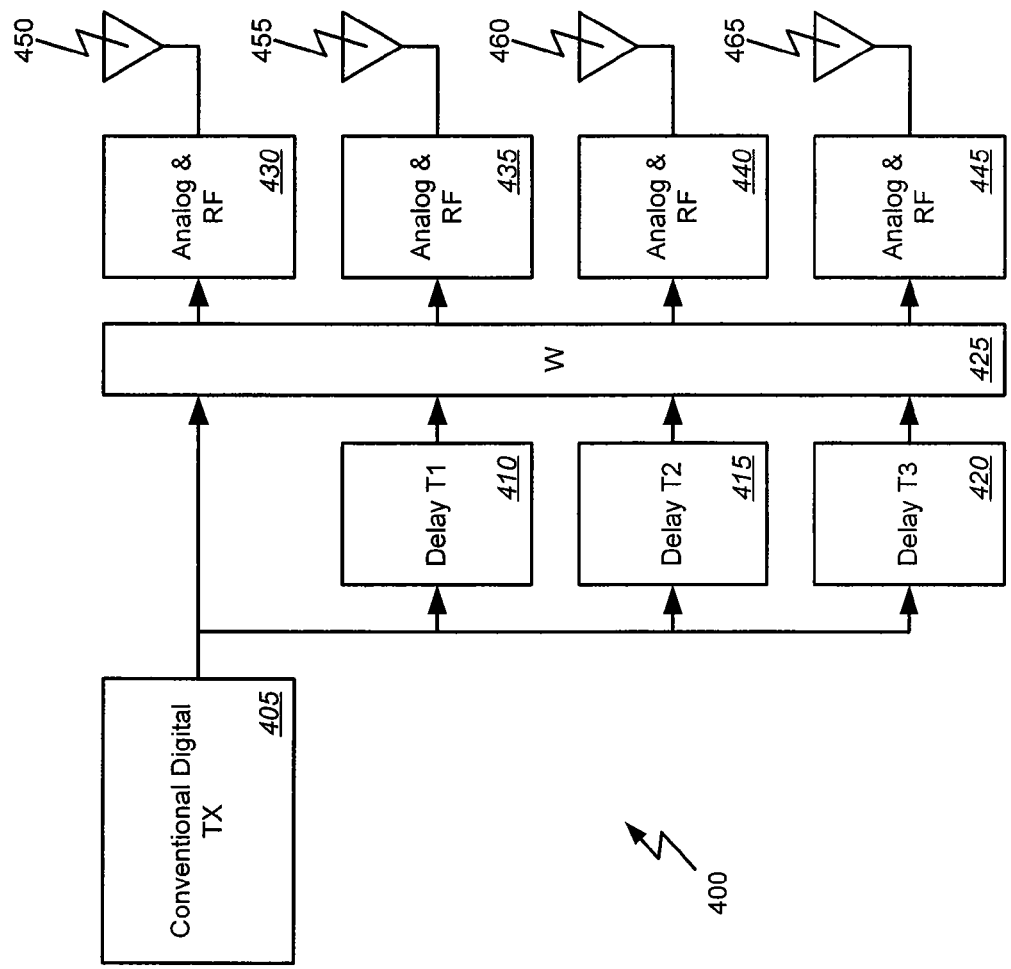
FIG. 4 illustrates a block diagram of a system for performing linear delay diversity in combination with spatial rotation according to yet another alternative embodiment of the present invention.

FIG. 4 illustrates a system that employs linear delay diversity in combination with spatial rotation. Such a system is especially applicable to 802.11b or similar transmissions (mainly to 1 and 2 Mbps rates as the CCK rates are not as robust to delay spread). The system can also be used for 802.11 a rates and for MIMO rates with $N_{ss}>1$ For the latter, each spatial stream produces several delayed copies.

This system 400 includes a conventional digital transmitter 405 that provides four transmit streams ($N_{tx}=4$). A different cyclic delay can be applied to each of the transmit streams ($N_{tx}$) by a plurality of delay modules 410-420. Stated another way, delay modules 410-420 provide a means for introducing time shifts to each of a plurality of spatial stream signals. Achieving these time shifts can be accomplished by introducing cyclic shifts or by introducing linear shifts. Introducing the cyclic shifts may comprise introducing cyclic delays or cyclic advantages to at least one of the plurality of spatial streams.

A spatial rotation can be applied to the individual spatial streams by Walsh matrix operation 425. That is, Walsh matrix operation 425 provides means for operating on each of the plurality of spatial stream signals with a spatial rotation vector matrix, thereby mapping each of the plurality of spatial stream signals to one of the transmit signals.

Finally, the output of the Walsh matrix operation 425, i.e., the individual, spread transmit streams, can be used to modulate a Radio Frequency (RF) carrier by analog and RF modules 430-445 for transmission by antennas 450-465.

Figure 5:
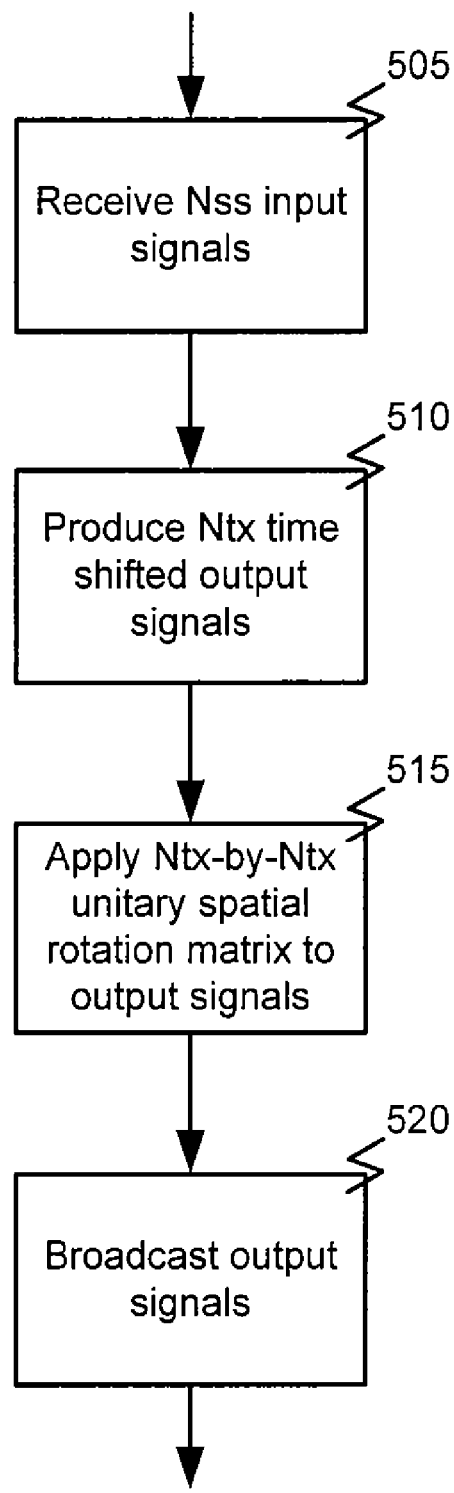
FIG. 5 is a flowchart illustrating a process for performing delay diversity and spatial rotation according to one embodiment of the present invention.

FIG. 5 is a flowchart illustrating a process for performing delay diversity and spatial rotation according to one embodiment of the present invention. In this example, operation begins with receiving 505 a number ($N_{ss}$) of input signals. A number ($N_{tx}$) of output signals can be produced 510 that are time shifted copies of the $N_{ss}$ input signals. As noted above, $N_{tx}$ is greater than or equal to $N_{ss}$. Producing $N_{tx}$ output signals that are time shifted copies of the $N_{ss}$ input signals can comprise producing output signals that are linearly or cyclically shifted copies of the input signals. If cyclically shifted the output signals can comprise a cyclically delayed signal or a cyclically advanced signal. Furthermore, the output signals can be cyclically shifted in the time domain or in the frequency domain.

The output signals can be operated on using a $N_{tx}$-by-$N_{tx}$ unitary spatial rotation matrix 515. That is, the output signal can be applied to a $N_{tx}$-by-$N_{tx}$ Walsh matrix such as described above to provide a spatial rotation. Finally, the time shifted and spatially rotated output signals can be broadcast 520.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A transmitter usable for wireless communication, comprising:
    a plurality of transmit antennas, wherein each transmit antenna transmits a respective transmit signal;
    means for introducing respective time shifts to each of a plurality of spatial stream signals to produce a plurality of time-shifted spatial stream signals, wherein each of the plurality of spatial stream signals is based at least in part on a data stream;
    means for operating on each of the plurality of time-shifted spatial stream signals with a spatial rotation vector matrix to apply respective spatial rotation to each of the plurality of time-shifted spatial stream signals, to thereby map the plurality of time-shifted spatial stream signals respectively to the respective transmit signals that are respective time-shifted spatially-rotated spatial stream signals of a plurality of time-shifted spatially-rotated spatial stream signals, to reduce nulls, including deep nulls, associated with the data stream, in a received channel, wherein the spatial rotation vector matrix is a Walsh matrix; and means for transforming each of a plurality of spatial stream signals using an Inverse Fast Fourier Transform (IFFT), wherein the means for transforming is applied to the plurality of spatial stream signals before the means for introducing respective time shifts is applied to each of the plurality of spatial stream signals and before the means for operating on each of the plurality of time-shifted spatial stream signals with a spatial rotation vector matrix.

2. The transmitter of claim 1, wherein the means for introducing time shifts to each of a plurality of spatial stream signals comprises means for introducing cyclic shifts.

3. The transmitter of claim 2, wherein the means for introducing cyclic shifts to each of a plurality of spatial stream signals comprises means for introducing cyclic delays to at least one of the plurality of spatial streams.

4. The transmitter of claim 2, wherein the means for introducing cyclic shifts to each of a plurality of spatial stream signals comprises means for introducing cyclic advances to at least one of the plurality of spatial streams.

5. The transmitter of claim 2, wherein the means for introducing cyclic shifts to each of a plurality of spatial stream signals comprises means for introducing cyclic shifts in the time domain.

6. The transmitter of claim 2, wherein the means for introducing cyclic shifts to each of a plurality of spatial stream signals comprises means for introducing cyclic shifts in the frequency domain.

7. The transmitter of claim 1, wherein the means for introducing time shifts to each of a plurality of spatial stream signals comprises means for introducing linear time shifts to each of a plurality of spatial stream signals.

8. A method of communicating in a wireless network, comprising:

receiving a number (Nss) of input signals;

transforming at least a portion of the Nss input signals using an Inverse Fast Fourier Transform (IFFT);

producing a number (Ntx) of output signals that are respectively time shifted copies of the Nss input signals, wherein Ntx is greater than or equal to Nss;

operating on the Ntx output signals using a Ntx-by-Ntx unitary spatial rotation matrix to provide respective spatial rotation to all of the Ntx output signals, wherein the Ntx-by-Ntx unitary spatial rotation matrix comprises a Walsh matrix, wherein the transforming of the at least a portion of the Nss input signals is performed before the producing of the number of Ntx output signals that are respectively time shifted copies of the Nss input signals and before the operating on the Ntx output signals using the Ntx-by-Ntx unitary spatial rotation vector matrix; and broadcasting the Ntx output signals, which are respectively time shifted and respectively spatially rotated, to reduce nulls, including deep nulls, associated with the Nss input signals, in a received channel that is one of a certain number of highly correlated channels.

9. The method of claim 8, wherein producing Ntx output signals that are time shifted copies of the Nss input signals comprises producing Ntx output signals that are cyclically shifted copies of the Nss input signals.

10. The method of claim 9, wherein producing Ntx output signals that are cyclically shifted copies of the Nss input signals comprises producing Ntx output signals wherein at least one of the Ntx output signals comprises a cyclically delayed signal.

11. The method of claim 9, wherein producing Ntx output signals that are cyclically shifted copies of the Nss input signals comprises producing Ntx output signals wherein at least one of the Ntx output signals comprises a cyclically advanced signal.

12. The method of claim 9, wherein producing Ntx output signals that are cyclically shifted copies of the Nss input signals comprises producing Ntx output signals that are cyclically shifted in the time domain.

13. The method of claim 9, wherein producing Ntx output signals that are cyclically shifted copies of the Nss input signals comprises producing Ntx output signals that are cyclically shifted in the frequency domain.

14. The method of claim 8, wherein producing Ntx output signals that are time shifted copies of the Nss input signals comprises producing Ntx output signals that are linearly shifted copies of the Nss input signals.

15. A wireless transmitter for transmitting a plurality of transmit stream signals, the transmitter comprising:

an Inverse Fast Fourier Transform (IFFT) module that transforms one or more of a plurality of spatial stream signals using an Inverse Fast Fourier Transform (IFFT);

a time shift module adapted to introduce time shifts to the one or more of the plurality of spatial stream signals to produce a plurality of time-shifted spatial stream signals, wherein the spatial stream signals are generated based at least in part on a data stream; and a spatial rotation module communicatively coupled with the time shift module and adapted to receive the plurality of time-shifted spatial stream signals from the time shift module and to operate on each of the time-shifted spatial stream signals with a spatial rotation vector matrix to apply respective spatial rotation to each of the plurality of time-shifted spatial stream signals, to thereby map each of the plurality of time-shifted spatial stream signals correspondingly to a respective one of the transmit stream signals that are respective time-shifted spatially-rotated spatial stream signals of a plurality of time-shifted spatially-rotated spatial stream signals, to reduce nulls, including deep nulls, associated with the data stream, in a received channel that is one of a certain number of highly correlated channels, wherein the spatial rotation vector matrix comprises a Walsh matrix, wherein the transformation of the one or more of the plurality of spatial stream signals using the Inverse Fast Fourier Transform (IFFT) is performed prior to the introduction of time shifts to the one or more of the plurality of spatial stream signals and prior to the operation on each of the time-shifted spatial stream signals with the spatial rotation vector matrix.

16. The transmitter of claim 15, wherein the time shift module is adapted to introduce cyclic shifts to one or more of the plurality of spatial stream signals.

17. The transmitter of claim 16, wherein the time shift module is adapted to introduce a cyclic delay to at least one of the plurality of spatial stream signals.

18. The transmitter of claim 16, wherein the time shift module is adapted to introduce a cyclic advance to at least one of the plurality of spatial stream signals.

19. The transmitter of claim 16, wherein the time shift module is adapted to introduce cyclic shifts in the time domain.

20. The transmitter of claim 16, wherein the time shift module is adapted to introduce cyclic delays in the frequency domain.

21. The transmitter of claim 15, wherein the time shift module is adapted to introduce linear time shifts to one or more of the plurality of spatial stream signals.

22. The transmitter of claim 15, wherein the spatial rotation vector matrix comprises the Walsh matrix having dimensions based at least in part on a number of spatial stream signals in the plurality of spatial stream signals and a number of transmit stream signals in the plurality of transmit stream signals.

23. A non-transitory computer-readable medium having stored thereon computer-executable instructions executed by a processor to perform the acts comprising:
   introducing respective time shifts to each of a plurality of spatial stream signals to produce a plurality of time-shifted spatial stream signals, wherein each of the plurality of spatial stream signals is based at least in part on a data stream;
   operating on each of the plurality of time-shifted spatial stream signals with a spatial rotation vector matrix to apply respective spatial rotation to each of the plurality of time-shifted spatial stream signals, to thereby map the plurality of time-shifted spatial stream signals respectively to transmit signals that are respective time-shifted spatially- rotated spatial stream signals of a plurality of time-shifted spatially-rotated spatial stream signals, to reduce nulls, including deep nulls, associated with the data stream, in a received channel, wherein the spatial rotation vector matrix is a Walsh matrix; and
   transforming each of a plurality of spatial stream signals using an Inverse Fast Fourier Transform (IFFT), wherein the transforming of each of a plurality of spatial stream signals using an Inverse Fast Fourier Transform (IFFT) is applied to the plurality of spatial stream signals before the introducing of respective time shifts is applied to each of the plurality of spatial stream signals and before the operating on each of the plurality of time-shifted spatial stream signals with a spatial rotation vector matrix.

24. The non-transitory computer-readable medium of claim 23, wherein the computer- executable instructions for introducing time shifts to each of the plurality of spatial stream signals further comprises computer-executable instructions for introducing cyclic shifts to each of the plurality of spatial stream signals.

25. The non-transitory computer-readable medium of claim 24, wherein the computer- executable instructions for introducing cyclic shifts to each of the plurality of spatial stream signals further comprises computer-executable instructions for introducing at least one of cyclic delays or cyclic advances to at least one of the plurality of spatial streams.

26. The non-transitory computer-readable medium of claim 24, wherein the computer- executable instructions for introducing cyclic shifts to each of the plurality of spatial stream signals further comprises computer-executable instructions for introducing cyclic shifts in at least one of a time domain or a frequency domain.

27. The non-transitory computer-readable medium of claim 23, wherein the computer- executable instructions for introducing time shifts to each of the plurality of spatial stream signals further comprises computer-executable instructions for introducing linear time shifts to each of the plurality of spatial stream signals.

* * * * *